(12) United States Patent
Johannsen et al.

(10) Patent No.: US 7,614,208 B2
(45) Date of Patent: Nov. 10, 2009

(54) HIGH SPEED COTTON PICKER DRUM

(75) Inventors: Daniel John Johannsen, Des Moines, IA (US); Jeffrey Robert Fox, Minburn, IA (US); Mark Samuel Philips, Akron, IA (US)

(73) Assignee: Deere & Company, Moline, IL (US)

( * ) Notice: Subject to any disclaimer, the term of this patent is extended or adjusted under 35 U.S.C. 154(b) by 133 days.

(21) Appl. No.: 11/770,108

(22) Filed: Jun. 28, 2007

(65) Prior Publication Data

US 2009/0000261 A1  Jan. 1, 2009

(51) Int. Cl.
- *A01D 46/16* (2006.01)
- *A01D 46/08* (2006.01)
- *A01D 46/14* (2006.01)

(52) U.S. Cl. .................. 56/47; 56/28; 56/43; 56/48
(58) Field of Classification Search .............. 56/28, 56/36–50
See application file for complete search history.

(56) References Cited

U.S. PATENT DOCUMENTS

| | | | |
|---|---|---|---|
| 2,672,001 A * | 3/1954 | Bopf et al. ............. 56/13.3 |
| 2,723,520 A * | 11/1955 | Hubbard ................. 56/47 |
| 3,040,506 A * | 6/1962 | Lindsay ................. 56/43 |
| 4,821,497 A | 4/1989 | Deutsch et al. |
| 5,247,786 A | 9/1993 | Schreiner |
| 5,355,663 A | 10/1994 | Deutsch et al. |
| 5,519,988 A | 5/1996 | Copley et al. |
| 5,622,038 A * | 4/1997 | Wigdahl et al. ........ 56/28 |
| 6,293,078 B1 * | 9/2001 | Deutsch et al. ........ 56/44 |

\* cited by examiner

*Primary Examiner*—Thomas B Will
*Assistant Examiner*—Joan D Misa

(57) ABSTRACT

To reduce destructive effects of cotton picker high speed drum rotation, rearward spindle tip motion is adjusted in part by angularly positioning the spindles in the picking zone with an improved cam track arrangement. The cam rotates the picker bar about the upright axis of the bar to vary the speed of the spindle tip in the picking zone and allow a higher drum speed. In a first portion of the picking zone the spindle tips are closer together than the spindle bases at the picker bar. The spindle tip spacing in a second portion of the picking zone is approximately equal to spindle base spacing in the extremities. The resulting spindle tip movement facilitates higher cotton picker vehicle ground speed without picking efficiency loss or additional damage to the cotton plants.

10 Claims, 4 Drawing Sheets

HIGH SPEED COTTON PICKER DRUM

FIELD OF THE INVENTION

The present invention relates generally to cotton pickers and, more specifically, to the harvesting drum on a cotton picker row unit.

BACKGROUND OF THE INVENTION

A typical spindle-type cotton picker includes upright cotton picker drums with bars or columns of rotating spindles that engage the cotton plants. The drums are rotated so the rearward motion of the spindles in the picking zone is synchronized to the forward speed of the picker to generally obtain zero relative velocity between the cotton plant and the spindles engaging that cotton plant.

The picker drums present a large mass in motion with numerous rotating parts and therefore have a limited rotational speed. The drum speed limitation dictates the maximum harvest speed of the picker. Attempts to increase picker speed have concentrated on reduction of drum mass, better lubrication of the rotating elements that experience increased friction with increased speed, and minimization of acceleration of mass as the columns of spindles are oriented by a by picker bar cam arm and a cam track.

Previously available row units using the drum circumferential speed to achieve the synchronization also included a cam track that angularly positioned the spindles to move the tips of the spindles closer in the picking zone. This angular positioning of the spindles increased the spindle density in the picking zone but actually compromised spindle/plant synchronization in the zone since the effect of decreasing spacing was to slow the rearward speed of spindles in the zone. The spindle tips moved more slowly than their bases generally throughout the entire picking zone, and in an aft portion of the zone the spindle tip velocity decreased even more. Therefore, forward harvester speed was limited by the slowing of the spindles in the picking zone.

SUMMARY OF THE INVENTION

The present invention reduces destructive effects of cotton picker high rotational drum speed by more closely synchronizing the rearward spindle tip motion with the forward speed of the cotton picker, in part by use of improved angular positioning the spindles in the picking zone. An improved cam track arrangement of the present invention angularly positions the spindles so that spindle tip spacing in a substantial portion of the picking zone is equal to spindle base spacing in the extremities to thereby maintain closer plant/spindle synchronization over a substantial portion of the zone. Only in one portion of the picking zone are the spindle tips closer together than the spindle bases. Over the remainder of the picking zone, the spindle speed is more closely synchronized to the harvester speed. Rearward spindle tip motion is adjusted by the angular positioning of the spindle bars by the cam arrangement. The cam rotates the picker bar about the upright axis of the bar to vary the speed of the spindle tip in the picking zone and allow a higher drum speed. As a result, a higher cotton picker vehicle ground speed can be achieved without loss of picking efficiency and without any additional damage to the cotton plants that are being picked. In one embodiment, for example, the drum with the improved cam configuration facilitates increases in the maximum harvester speed from about 14% to 25% compared to a conventional cam configuration without loss of picking efficiency or additional damage to the cotton plants being picked. The improved cam configuration also provides smoother picker bar pivoting action to avoid excessive bearing forces and reduce slinging of cotton from the spindles.

DESCRIPTION OF THE PREFERRED EMBODIMENT

Figure 1:
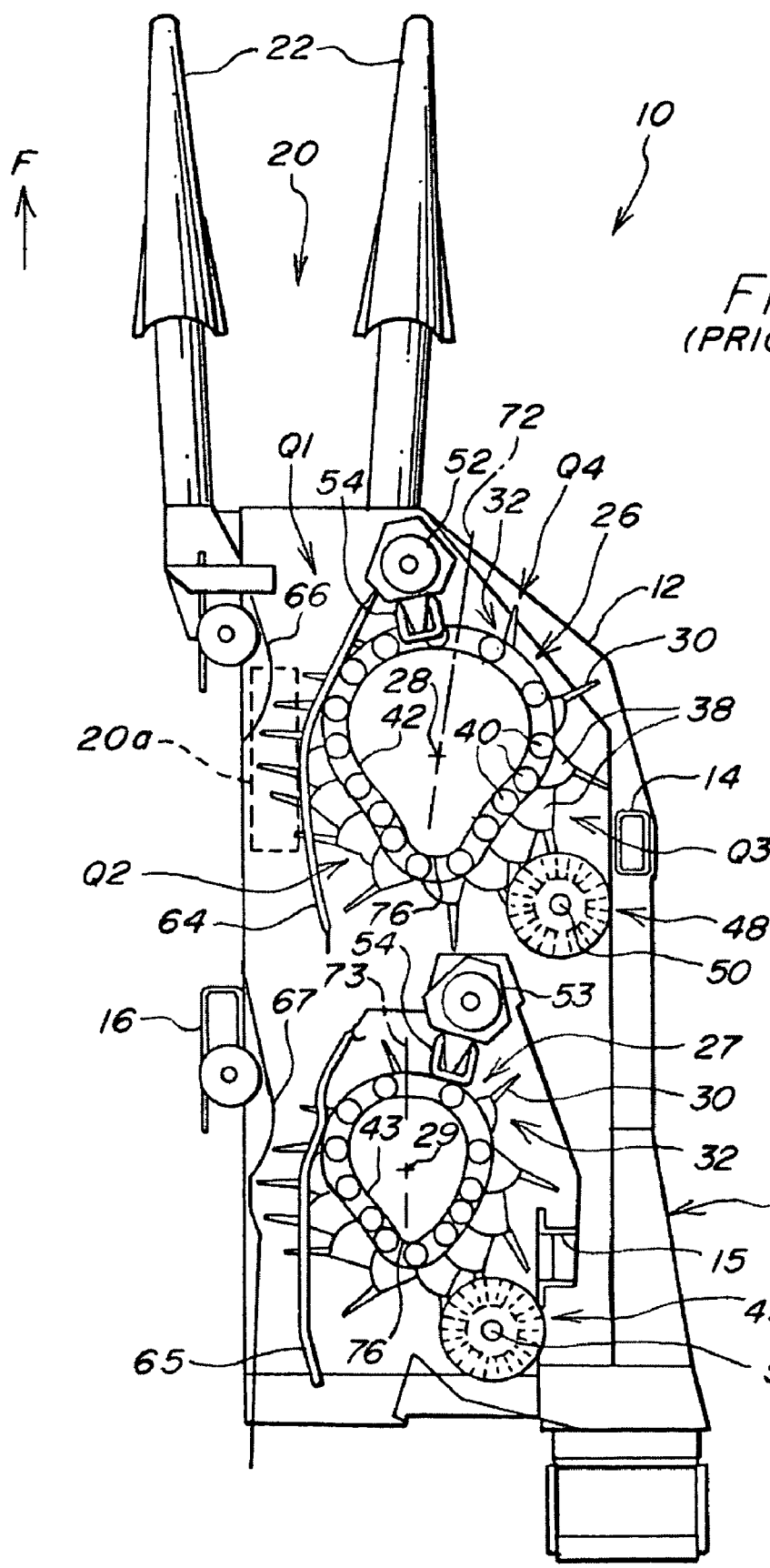
FIG. 1 is a top view of a conventional cotton picker row unit.

Referring now to FIG. 1 therein is shown a conventional row unit 10 for a cotton picker. The row unit 10 includes a housing 12 with upright structural members such as shown at locations 14, 15 and 16. A fore-and-aft extending row-receiving area 20 is defined which extends rearwardly from between a pair of stalk lifters 22 through to the rear of the housing 12. Front and rear upright picker drums 26 and 27 with upright rotational axes 28 and 29 are supported within the housing 12 and include spindles 30 supported in rows by a plurality of upright spindle or picker bars 32. The spindles 30 include rows of barbs (not shown) extending generally in the direction of rotation of the spindles. The picker bars 32 are supported for rotation about upright axes such as shown at 36 in FIG. 3 uniformly spaced about a circle C1 of radius R1 which centers on the rotational axis 28 of the drum. Each picket bar 32 includes a cam arm 38 with an upper cam roller 40 supported within the track of a cam 42 or 43 for the drum 26 or 27, respectively, which orients the bars 32 for the desired spindle position as the drum rotates about its upright axis. The spindles enter a picking zone 20a (FIGS. 1 and 2) in the row-receiving area 20 in first and second drum rotation quadrants Q1 and Q2 in the counterclockwise direction from the forwardmost extremity of the drum.

Doffer columns 48 and 49 are supported for rotation about upright axes 50 and 51 parallel to and rearwardly and outwardly of the corresponding drum axes 28 and 29 (i.e., in the third quadrant Q3 from the forwardmost extremity of the drum) for doffing cotton from the spindles. Supported adjacent the forwardmost extremities of the drums 26 and 27 (in the fourth quadrant Q4) are upright moistener columns 52 and 53, each with spindle-wiping pads 54 connected to a nozzle and distribution system located within the housing 12 for wiping the spindles 30 after cotton is doffed therefrom. The rear drum 27 is spaced a sufficient distance rearwardly of the forward drum 26 so that the path of the spindles 30 of the forward drum 26 does not intersect the rear moistener column 53.

A conventional drive mechanism including a spindle drive 58 (see FIG. 3) rotates the drums, spindles and doffers. As the drums 26 and 27 rotate in the counterclockwise direction as viewed in FIG. 1 through four quadrants (Q1-Q4) starting with the forwardmost portion of the drum, the path of the spindles 30 is controlled by the cam arm 38, roller 40 and track 42 so that the spindles project into the row-receiving area 20a through grid bars 64 and 65 (quadrants Q1 and Q2) as the drive 58 rotates the spindles 30 in contact with the cotton in a picking zone 20a. As shown in the drawings, the row unit 10 is an in-line unit with the drums and drum axes on one side only of the row-receiving area so that cotton is picked from one side of the plant. Pressure plates 66 and 67 urge the plants inwardly toward the spindles 30. The cotton-wrapped spindles 30 are moved under the doffers of the doffer columns 48 and 49 in the quadrant Q3, and cotton is doffed from the spindles and directed rearwardly and outwardly to door structure 70 to be conveyed to the harvester basket (not shown).

As seen in FIG. 1, the cams 42 and 43 are elongated in the fore-and-aft direction and have elongate axes 72 and 73. The cams 42 and 43 have a comma-shaped configuration with abrupt or relatively sharp changes of direction at the tail or rearmost portion 76. As the drums rotate, the cam configuration causes the spindle bar near the rear of the drum to accelerate quickly and rotate about the bar axis through a transition area (between the row-receiving area and the doffer column) and into a position wherein the doffers can start to unwind cotton from the spindles 32. After the cotton is doffed and the spindles move into the fourth quadrant Q4, the cams accelerate the spindles quickly for reentry into the row receiving area 20. In the same quadrant Q4, the spindles pass through the moistener column. As the spindles 30 contact the pads 54 of the moistener column and begin to be reoriented for entry into the row-receiving area, the axes of the spindles are angled forwardly with respect to the leading and trailing edges of the pads.

Figure 2:
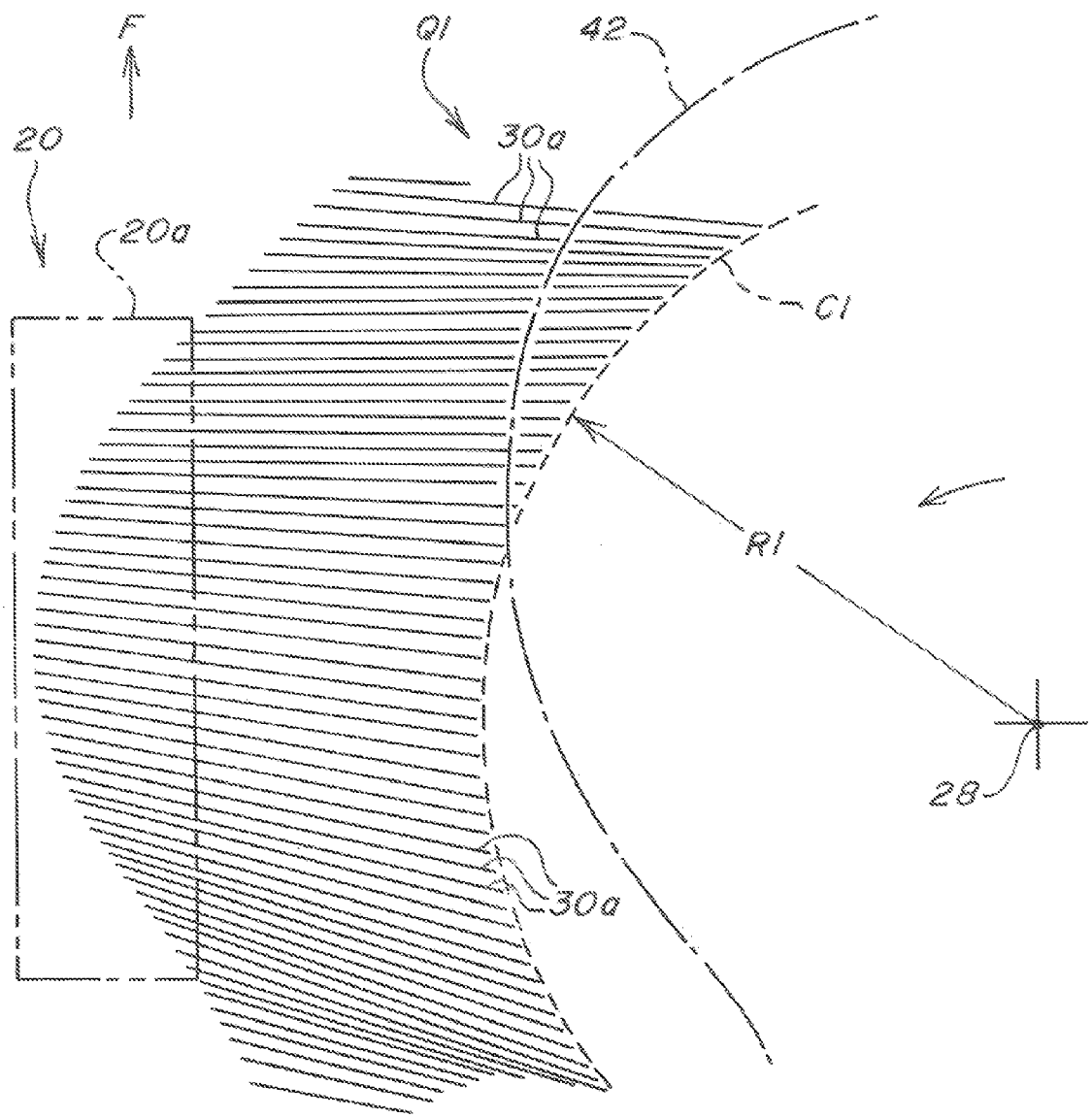
FIG. 2 is an enlarged top view of a portion of the cam track for controlling spindle orientation in the picking zone of one of the drums of conventional unit of FIG. 1 showing schematically spindle orientation at a plurality of locations in the picking zone.

The path and orientation of the spindle axes 30a in the picking zone 20a for the unit of FIG. 1 is shown schematically in FIG. 2. The picking zone 20a is defined generally as the area wherein the spindles 30 project approximately one inch (2.5 cm) or more through the grid bars into the cotton plants passing rearwardly relative to the drum. At the first or leading portion of the zone 20a the spindles project generally perpendicularly to the forward direction F of travel of the harvester. At the leading portion of the zone 20a, the rearward speed of spindle tip is approximately equal to but slightly less than the forward harvester speed. As the spindle moves rearwardly in the zone, the cam track 42 continually angles the spindle axes 30a in the forward direction effectively slowing the rearward speed of the spindles 30 so that spindle tip speed slows even more relative to harvester speed. The effective slowing of the fore-and-aft speed of the spindle further reduces synchronization. At the rearward portion of the picking zone 20a, spindle tip spacing in minimized, spindle density is maximized, and spindle to plant synchronization is reduced to the lowest level within the picking zone.

Figure 3:
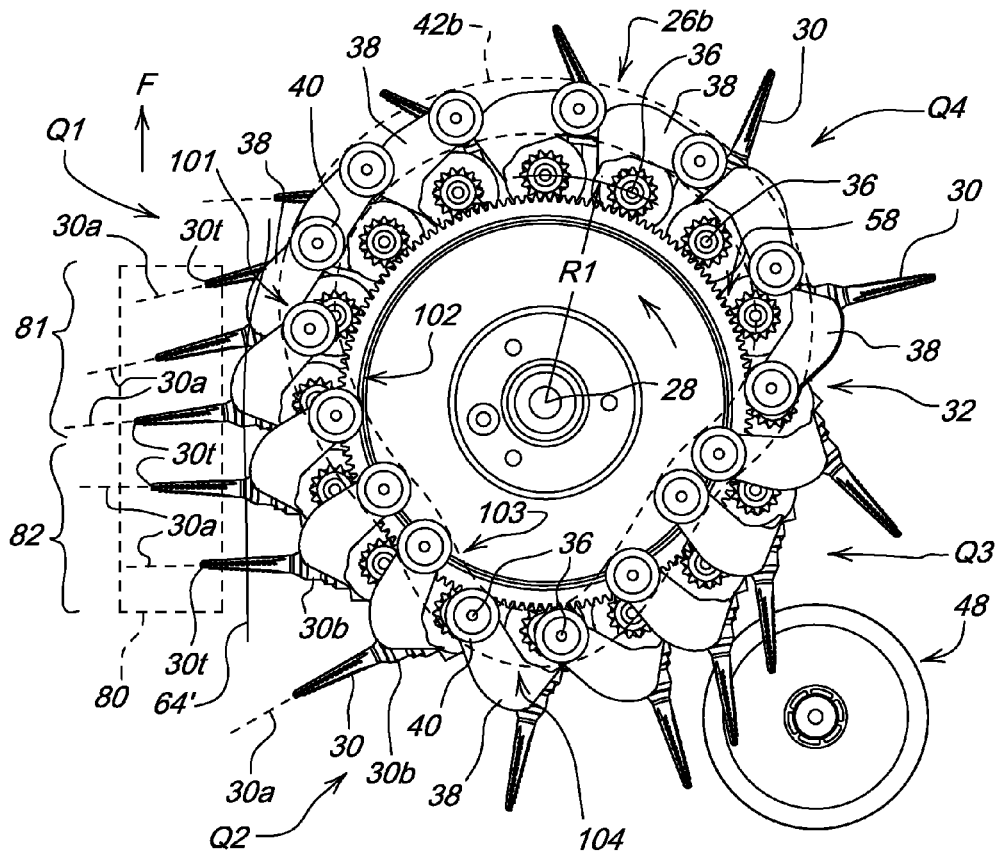
FIG. 3 is a top view of an improved row unit configuration showing the cam track in broken lines.
Figure 3:
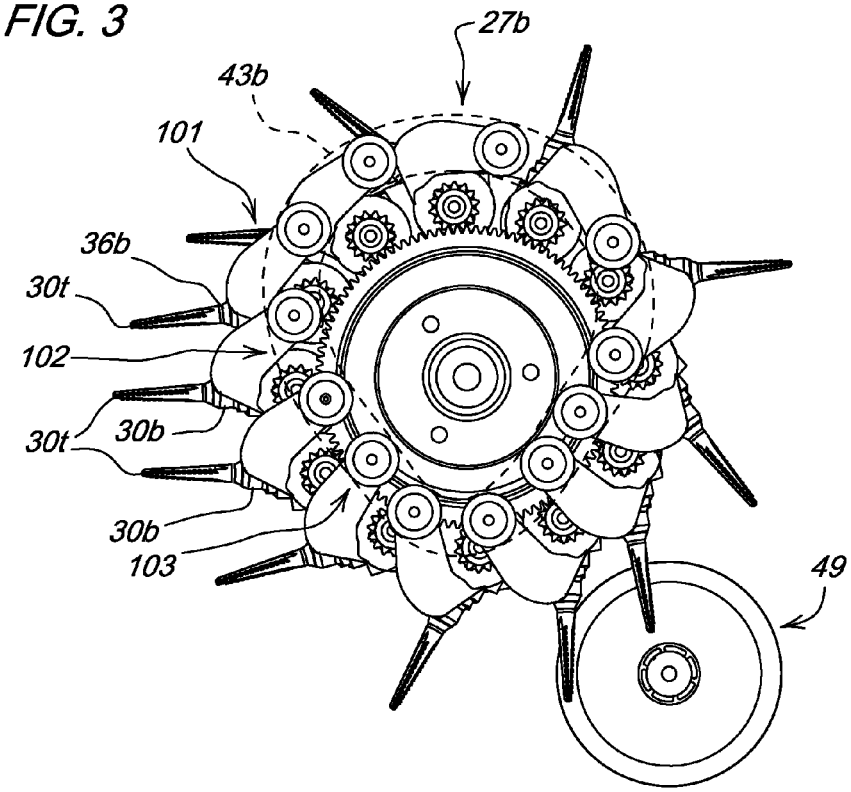
Figure 4:
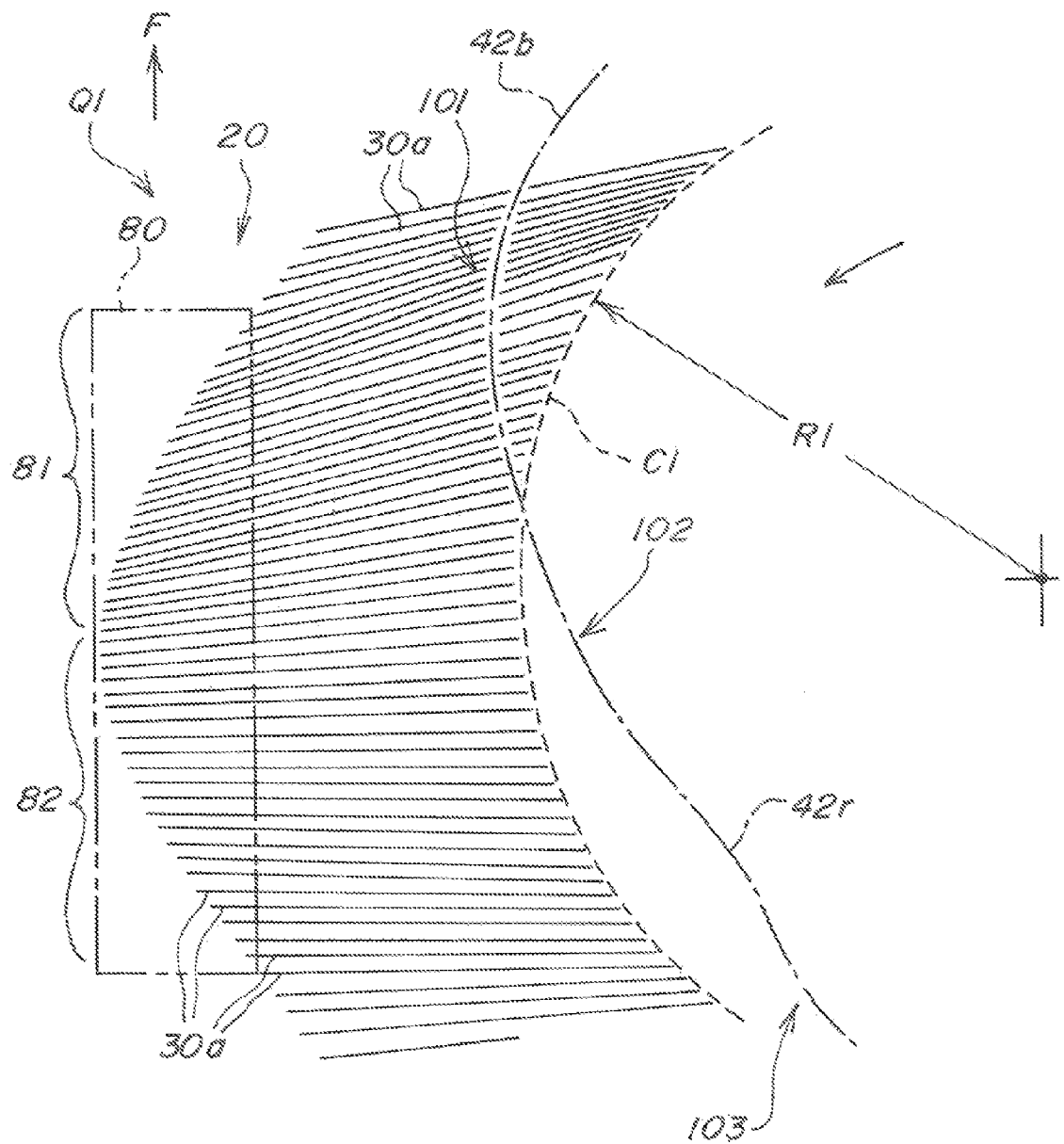
FIG. 4 is a view similar to FIG. 2 showing the improved cam track of FIG. 3 and illustrating the improved spindle orientation providing advantageous spindle movement for increased drum speed.

Referring now to FIGS. 3 and 4 therein is shown an improved drum arrangement wherein the cam tracks 42b and 43b for drums 26b and 27b are reconfigured to provide improved plant engagement and synchronization of the plants and the spindles 30 projecting through the grid bar 64' into the plants in an elongated picking zone 80. The tracks 42b and 43b pivot the upright bars 32 to angle the spindle axes 30a rearwardly and increase spindle density in a first portion 81 of the zone. The bunching of the spindle tips 30t tends to decrease the rearward speed of the spindles 30 relative to the drum when the spindles are in the first portion 81 of the picking zone.

In a second portion 82 of the picking zone 80, the cam tracks 42b and 43b pivot the spindles so the spindle axes 30a are generally parallel to maintain the rearward speed of spindle tips 30t approximately equal to the rearward speed of the corresponding spindle bases 30b. The spindle axes 30a in the second portion 82 are generally transverse to the forward direction F. When the spindles 30 are in the second portion 82 of the zone 80, the speed of the spindle tip 30t more closely approximates the drum periphery speed and better matches the rearward speed of the plant relative to the row unit. The cam track configuration provides increased spindle density in the first portion 81 of the picking zone 80 and more closely approximates zero velocity between the spindles 30 and the plants engaged by the spindles in the second portion 82. The increased spindle density at the forward portion of the zone 80 assures good spindle contact with a substantial portion of the cotton plant to initiate engagement of the spindle barbs with the cotton bolls. The parallel and transverse spindle orientation in the aft portion 82 of the picking zone 80 provides excellent spindle engagement and cotton removal from the plants. A reverse curve in the cam track at 42r in the quadrant Q2 provides a smooth spindle transition out of the aft portion of the picking zone 80 in preparation for movement of the cotton wrapped spindles into the doffing zone adjacent the doffer 48. The configuration of the cam track 43b and spindle orientation for the rear drum 27b is similar to that described above for the forward drum 26b and will not be described in further detail here.

As can best seen by comparing FIG. 4 and the prior art configuration of FIG. 2, the cam track 42b is curved more outwardly at a first cam track portion 101 relative to the circle C1 of the spindle bars in quadrant Q1. The increased outward bowing of the first cam track portion 101 causes the spindle bars to pivot the spindles 30 towards the rear so that the spindle axes 30a in the first portion 81 of the zone are angled rearwardly towards the second portion 82 with respect to a direction transverse to the forward direction. The spindle tips 30t move more closely to each other, and the spindle tip spacing is less than the spindle base spacing for the spindles in the first portion 81.

The cam track 42b curves radially inwardly and crosses the circle C1 near the intersection of the quadrants Q1 and Q2 to a juncture with a second cam track portion 102. As the cam roller 40 follows the cam track portion 102, the picker bars are rotated about their upright axes to position the spindle axes 30a in a parallel relationship in the picking zone portion 82. The bar rotation also increases the rearward velocity of the spindle tips 30t. In the zone 82, the spacing of the spindle tips 30t is approximately equal to the spacing of the corresponding spindle bases 30b.

The cam track 42b includes a third portion 103 which gently curves radially outwardly to smoothly pivot the spindle bar 32 in the counterclockwise direction as viewed in FIG. 3. The third portion 103 is directly above a lowermost portion 104 of the comma shaped cam track configuration at the juncture of the second and third quadrants Q2 and Q3. As the cam track crosses the circle C1 at the portion 104, the spindles are oriented with respect to the doffer column 48 for removal of the cotton from the spindle.

Having described the preferred embodiment, it will become apparent that various modifications can be made without departing from the scope of the invention as defined in the accompanying claims.

The invention claimed is:

1. A cotton picker row unit including a spindle-type cotton picker drum rotatable about an upright drum axis and movable at a forward harvesting speed through cotton plants, the drum rotatable about the drum axis at a drum speed generally synchronized with the harvesting speed and comprising a plurality of pivotable upright bars, each bar including rotating picker spindles, each spindle including a spindle base and a spindle tip projecting from the bar, a cam arm connected to the bar and having a cam-engaging portion, a cam track connected to the row unit and receiving the cam-engaging portion, the cam track orienting the picker bar about an upright picker bar axis to position the spindles in a fore-and-aft extending picking zone for engagement of the spindles with cotton plants in the zone, the cam track including a first track portion pivoting the upright bars and changing the orientation of the spindles in a first picking portion of the picking zone to slow spindle tip speed in a fore-and-aft direction and thereby decrease fore-and-aft spacing of the spindle tips to increase spindle density in the first picking portion of the zone, the slowing of the spindle tip speed reducing synchronization of the spindles relative to the engaged cotton plants adjacent a transition area between the first picking portion and a second picking portion rearwardly adjacent the first picking portion, wherein the spindle penetration of the picking zone approaches a maximum adjacent the transition area, the cam track including a second track portion maintaining spindle tip spacing generally equal to spindle base spacing to adjust relative velocity between the plants and the spindles in the second picking portion of the zone, the cam track increasing synchronization towards the aft end of the second picking portion.

2. The row unit as set forth in claim 1 wherein the second picking portion is located rearwardly of the first picking portion.

3. The row unit as set forth in claim 2 wherein the pivotable upright bars included pivots arranged in a circle, and wherein the cam track is comma shaped with a narrowed downstream end, the second track portion located upstream and adjacent the narrowed downstream end, and a reverse curve track portion located between the second track portion and the narrowed downstream end to smoothly accelerate the spindles out of the second picking portion.

4. A cotton picker row unit including a spindle-type cotton picker drum rotatable about an upright drum axis and movable at a forward harvesting speed through cotton plants, the drum comprising a plurality of pivotable upright bars and rotatable about the drum axis at a drum speed generally synchronized with the harvesting speed, each bar including rotating picker spindles, each spindle including a spindle axis, a spindle base and a spindle tip projecting from the bar, a cam arm connected to the bar and having a cam-engaging portion, a cam connected to the row unit and receiving the cam-engaging portion, the cam orienting the picker bar about an upright picker bar axis to position the spindles in a fore-and-aft extending picking zone for engagement of the spindles with cotton plants in the zone, the cam including a first track portion for slowing rearward spindle tip speed to decrease fore-and-aft spacing of the spindle tips and increase spindle density in a first portion of the zone and a second track portion rotating the spindle bar to increase rearward velocity of the spindle tips in a second portion of the picking zone offset from the first portion of the zone, wherein the rearward velocity of the spindle tips adjacent a transition area between the first and second zones is substantially slower than the forward harvester speed, and the rearward velocity of the spindle tips at a forward end of the second portion is below the harvesting speed but more closely approximates the harvester speed toward an aft end of the second portion than in the first portion.

5. The cotton picker row unit as set forth in claim 4 wherein the second track portion maintains axes of the spindles in the second portion of the picking zone in generally parallel relationship.

6. The cotton picker as set forth in claim 4 wherein the first track portion maintains the axes of the spindles in the first portion of the picking zone angled rearwardly towards the second portion of the picking zone.

7. The cotton picker as set forth in claim 6 wherein the second track portion maintains the axes of the spindles in the second portion of the picking zone generally transverse to the forward direction, and wherein the spindles exit from the second portion of the picking zone with the spindle axes transverse to the forward direction.

8. In a cotton picker row unit including a spindle-type cotton picker drum rotatable about an upright drum axis and movable at a harvesting speed in a forward direction through cotton plants, the drum comprising a plurality of pivotable upright bars and rotatable about the drum axis at a drum speed generally synchronized with the harvesting speed to provide approximately zero velocity between the plants and the drum in a fore-and-aft extending picking zone, each bar including rotating picker spindles, each spindle including a spindle base and a spindle tip projecting from the bar, and cam structure for pivoting the bars to orient the spindles in the picking zone, means for increasing spindle density in a first portion of the picking zone and reducing synchronization of the spindles with the cotton plants in the first portion as the spindles approach a maximum transverse penetration of the cotton plants, and means for increasing the synchronization of the spindles with the cotton plants in a second portion of the picking zone adjacent the first portion including means for pivoting the upright bars to increase spindle density in the first portion of the zone and decrease the rearward speed of the spindles relative to the drum when the spindles are in the first portion of the zone; and means for pivoting the upright bars to increase the rearward speed of the spindle tips when the spindles are in the second portion of the zone as compared to the speed of the spindle tips when the spindles are in the first portion approaching the second portion to reduce relative velocity between the spindles tips in the second portion and the plants engaged by the spindles tips.

9. The cotton picker row unit as set forth in claim 8 wherein the means for pivoting the upright bars to increase spindle density in the first portion of the zone and decrease the rearward speed of the spindles relative to the drum when the spindles are in the first portion of the zone comprises a first cam section pivoting the upright bars to angle the spindles rearwardly in the first portion of the zone.

10. The cotton picker row unit as set forth in claim 8 wherein the means for pivoting the upright bars to increase the rearward speed of the spindle tips when the spindles are in the second portion of the zone comprises a second cam section pivoting the upright bars to maintain the spindles generally parallel and transverse to the forward direction.

* * * * *